UNITED STATES PATENT OFFICE.

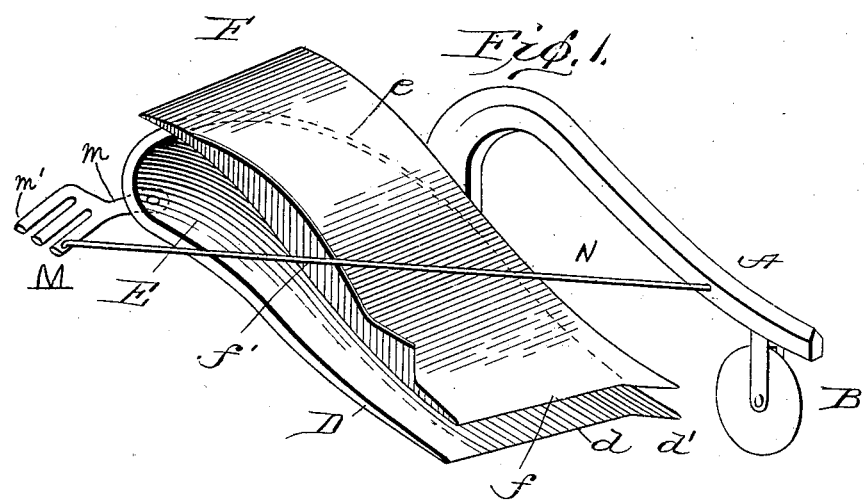
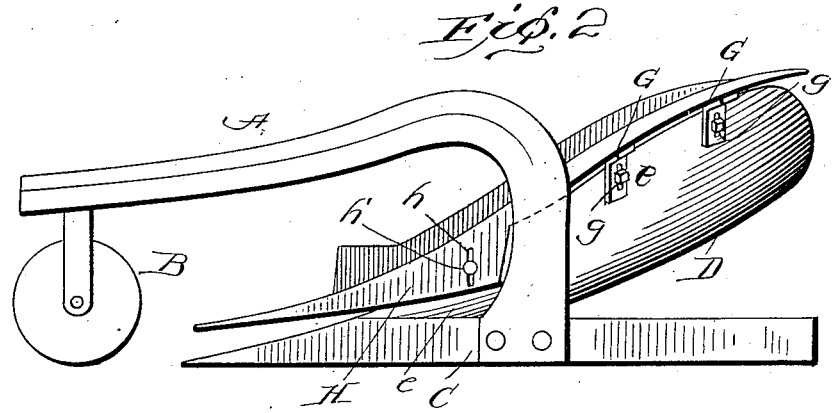
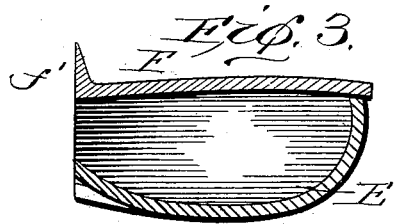
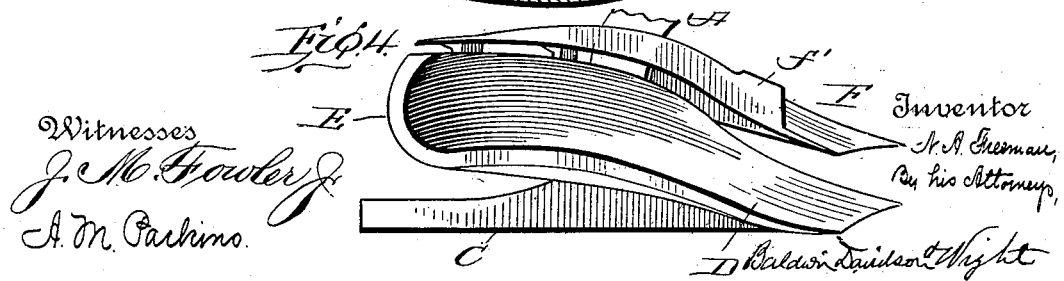

NICHOLAS A. FREEMAN, OF TILLAMOOK, OREGON, ASSIGNOR OF ONE-HALF TO BENJAMIN L. EDDY, OF TILLAMOOK, OREGON.

PLOW.

SPECIFICATION forming part of Letters Patent No. 725,835, dated April 21, 1903.

Application filed September 17, 1902. Serial No. 123,708. (No model.)

*To all whom it may concern:*

Be it known that I, NICHOLAS A. FREEMAN, a citizen of the United States, residing at Tillamook, in the county of Tillamook and State of Oregon, have invented certain new and useful Improvements in Plows, of which the following is a specification.

The object of my invention is to provide what I call a "fertilizing-plow"—*i. e.*, one which may be used to fertilize or renew meadows and grass-lands without reseeding by simply raising the sod, depositing it again in its original position, and while the sod is raised causing a proper quantity of soil to be deposited upon the adjoining land.

I accomplish the object of my invention by providing a plow with a double moldboard, the upper one being adapted to lift the sod and drop it behind the plow without turning it over, while the lower one receives soil from the bottom of the furrow and guides it rearwardly and laterally out from the plow onto the adjoining land.

In the accompanying drawings I have merely shown those parts of a plow to which my invention relates.

Figure 1 shows a perspective view of so much of a plow embodying my improvements as is necessary to illustrate the subject-matter of my invention. Fig. 2 is a side elevation of the same on the land side. Fig. 3 shows a transverse section through the rear portion of the moldboards. Fig. 4 is a side elevation of the opposite side of the plow to that shown in Fig. 2.

Only a portion of the plow-beam A is shown, a colter B of ordinary construction being attached to the beam near its front end to sever the furrow-slice from the land or unplowed portion in the usual way when passing the first time around the field. The plow-beam is secured to a share C, in the manner shown in Fig. 2.

The lower moldboard D is of peculiar formation. At its front end it is slightly inclined, as indicated at $d$, in a horizontal line relatively to the line of draft, and may be pointed at $d'$ to enable it to easily penetrate the soil. From the front edge $d$ the moldboard slopes upwardly and rearwardly, preferably in curved lines which merge into a laterally-curved portion E at the rear, open on the side of the plow opposite the land side. That side of the lower moldboard $e$ adjacent the land side is closed, as is also the rear end of this lower moldboard, the arrangement being such that the soil which passes over the lower moldboard will be guided out laterally at E and deposited upon the sod at one side of the plow. The upper moldboard F has a front end $f$, corresponding to the front end of the lower moldboard. This upper surface slopes upwardly in an inclined and preferably a double-curved or S-shaped direction toward the rear end of the plow in such manner that the sod may be severed from the soil and caused to slide over the upper surface of the upper moldboard and be deposited or dropped at the rear end of the plow without being turned over. A flange $f'$ is preferably employed on that side of the plow next the previously-plowed portion to prevent the sod from slipping off sidewise accidentally.

The upper moldboard may be attached to the plow in any suitable way, it being important, however, that it should be arranged a sufficient distance above the lower moldboard to allow a proper quantity of soil to pass under it and over the lower moldboard. Preferably the connection between the two moldboards is made as indicated in the drawings. The upper moldboard is there shown as provided with brackets G, which are slotted to receive bolts $g$, which pass into the upper edge of the lower moldboard. The upper moldboard is provided with a flange H on the land side, which is slotted at $h$ to receive a bolt $h'$, which passes into the lower moldboard. By these devices the moldboards may be securely fastened together, and they may be adjusted so as to vary the distance between them, and thus regulate the quantity of soil which passes over the lower moldboard and is deposited upon the adjoining sod.

I preferably employ a device M, which I call a "spreader" or "leveler." It consists of an arm $m$, hinged to the lower moldboard near its rear end and connected at its outer end with a series of fingers $m'$ with spaces between them. The front finger is connected by means of a brace-rod N with the plow-beam toward its front end. The purpose of this device is to level down the ridge of loose soil thrown out by the lower moldboard from the bottom of the furrow. The device is arranged in such manner that the soil will fall partly in front of the leveler and also on top of it and pass down through the spaces between the fingers. In this way the soil is deposited and laid in a smooth and even condition instead of being laid in a ridge.

It will be observed that the soil which is conveyed by the lower moldboard onto the adjoining sod is taken from the bottom of the furrow. When deposited upon the sod, it acts as a fertilizer and does away with the necessity of reseeding or renewing. It will thus be seen that much valuable time is saved. In countries where rain prevails there is often more or less moss on meadow lands. The fine loose soil which is deposited by my plow upon such land will rot or kill the moss and the grass will start up through this loose soil and will grow rapidly.

I do not confine myself to the precise construction shown in the drawings. The moldboards may be differently shaped and may be attached in different ways, the important part of my invention being the use of two moldboards, one of which lifts the sod and drops it without turning it over, while the other takes soil from beneath the sod and deposits it upon the adjoining sod.

I claim as my invention—

1. A plow provided with two moldboards one above the other with a clear space between them for the passage of soil, each moldboard having at the front an exposed cutting edge and the upper moldboard having a backwardly-inclined upper surface at its rear end.

2. A plow provided with two moldboards arranged one above the other having a clear space between them, and each having an exposed front cutting edge, the lower moldboard having a surface inclined upwardly and sidewise to afford a lateral discharge while the upper moldboard has a surface inclined upwardly and rearwardly affording a rear discharge for the sod.

3. A plow provided with two moldboards arranged one above the other with a clear space between them from front to the rear, the upper moldboard having an exposed front cutting edge and a surface extending upwardly and rearwardly to afford a rear discharge for the sod, and provided also with a side flange to prevent lateral discharge of the sod, the lower moldboard having an exposed front cutting edge and a curved surface extending rearwardly and laterally to provide a lateral discharge for the soil.

4. A plow having a lower moldboard for receiving soil from beneath the sod, an upper moldboard for lifting the sod, and devices for adjusting the upper moldboard relatively to the lower one.

5. A plow provided with two moldboards one above the other with a clear space between them for the passage of soil, each moldboard having at the front an exposed cutting edge and the upper moldboard having a backwardly-inclined upper surface at its rear end, in combination with a spreader or leveler attached to the lower moldboard near its rear end and projecting laterally therefrom.

6. A plow provided with two moldboards one above the other with a clear space between them for the passage of soil, each moldboard having at the front an exposed cutting edge and the upper moldboard having a backwardly-inclined upper surface at its rear end, in combination with a spreader comprising a hinged arm projecting laterally from the rear end of the lower moldboard and provided with laterally-projecting fingers with space between them for the purpose specified.

In testimony whereof I have hereunto subscribed my name.

NICHOLAS A. FREEMAN.

Witnesses:
 M. E. MOORE,
 CARL HABERLACH.